United States Patent [19]

Yates

[11] 3,980,316
[45] Sept. 14, 1976

[54] ROLL STABILIZED VEHICLE SUSPENSION SYSTEM

[75] Inventor: Jan Beryl Yates, Reynoldsburg, Ohio

[73] Assignee: Caterpillar Tractor Co., Peoria, Ill.

[22] Filed: July 7, 1975

[21] Appl. No.: 593,592

[52] U.S. Cl. ............................ 280/112 A; 280/711; 267/65 R
[51] Int. Cl.² ........................................ B60G 11/26
[58] Field of Search ........ 280/124 F, 112 R, 112 A, 280/702, 711; 267/64 R, 64 A, 35, 65 R

[56] References Cited
UNITED STATES PATENTS

| | | | |
|---|---|---|---|
| 2,568,401 | 9/1951 | Lynn | 280/112 A |
| 2,781,731 | 2/1957 | Furrer | 280/112 A |
| 3,201,141 | 8/1965 | Bernstein | 280/124 F |

Primary Examiner—M. H. Wood, Jr.
Assistant Examiner—John A. Carroll
Attorney, Agent, or Firm—Wegner, Stellman, McCord, Wiles & Wood

[57] ABSTRACT

A suspension for vehicles in the nature of large highway trucks, utilizing fluid springs to support the vehicle mass and load and additional fluid springs arranged to act in opposition to the supporting springs with the supporting and additional spring being cross-vehicle connected to provide stiffness against lateral forces (roll stiffness) while maintaining a softer springing in the upright direction, generally referred to as ride characteristic. Variations in roll stiffness characteristics may be achieved without stiffening ride characteristics.

8 Claims, 1 Drawing Figure

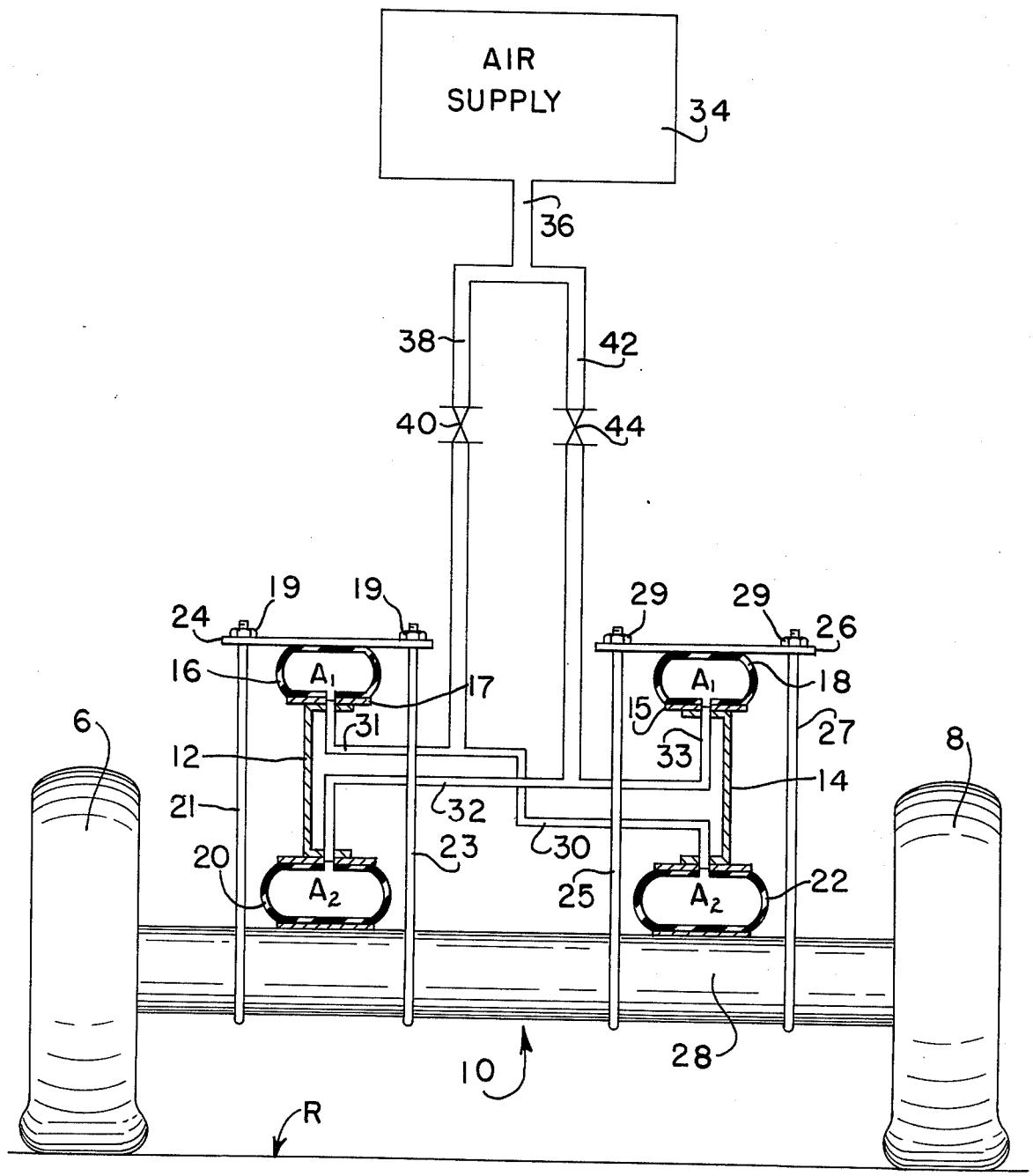

ROLL STABILIZED VEHICLE SUSPENSION SYSTEM

BACKGROUND OF THE INVENTION

Conventional suspensioning systems, especially those of large highway trucks, have generally been accomplished with leaf springs which are difficult to design so that a soft vehicle spring rate for ride characteristics can be provided with sufficient stiffness against roll to provide stability against lateral forces. Additional stabilizing bars and equipment have been used. Ordinarily, such springing of trucks provides a very hard ride. A compromise has been required, resulting in a stiff spring rate in up and down direction in order not to allow too soft a spring rate against roll of the vehicle under lateral force loads.

Air springs have been utilized in trucks and busses to support vehicle weight and load weight. Stabilization of the vehicle against roll has generally been provided in addition to such air springs and separate therefrom.

Vehicle roll stiffness has been achieved separate and apart from the springing by the use of hydraulic shock absorber units connected across a vehicle. U.S. Pat. No. 3,328,019 and British Pat. No. 1,335,758 (1973) are typical of such.

There has been a use of air springs on auxiliary load supporting axles of highway trucks. Generally, such air springs support part of the truck load to the axle. In some instances, auxiliary air springs have been used to raise the axle and its tires from contact with the road for avoiding tire wear when the truck is running empty. U.S. Pat. Nos. 3,201,141, 3,290,056 and 3,390,895 are typical of such auxiliary axle constructions.

SUMMARY OF THE INVENTION

The principal object of this invention is to provide a suspension system for the sprung mass of a vehicle relative to its wheeled supports having means for achieving low vertical stiffness desirable for a good ride and high roll stiffness desirable for roll stability.

Another object of the invention is to provide a suspension system for a vehicle with spring components supporting the weight of the sprung mass and also resisting upward movement of the sprung mass relative to its wheels, such components being so related as to increase roll stiffness without increasing vertical spring stiffness.

An additional object of this invention is to provide a system in which a material increase in roll stiffness of the vehicle suspension may be obtained by selection of the relative effective areas of the springs acting in opposition.

Another object is to provide a suspension system stabilized against roll but capable of increased load carrying capacity by increasing pressure in the springs while maintaining vertical spring rate within desirable limits and maintaining desired stiffness against roll.

DESCRIPTION OF THE DRAWING

The figure of the drawing is a diagrammatic upright view of a highway truck axle incorporating the suspension system of this invention.

DESCRIPTION OF THE PREFERRED EMBODIMENT

The diagrammatic illustration of the drawing contains the elements of the invention for carrying out the principles of this invention. The system generally indicated 10 may be incorporated with an axle 28 having wheels with tires 6 and 8 in contact with the road surface R. Ordinarily, such road vehicles have a relatively heavy frame, herein illustrated as a left-hand frame rail 12 of metal channel shape and a similar right-hand frame rail 14.

In contrast to the known air spring constructions for mere support of the vehicle weight and its load upon an axle, there is herein provided air springs both above and below the vehicle frame. Thus, there are located air springs which may be of a bladder-type, such as 16 and 18, of an effective area $A_1$ appropriately mounted above the frame rails 12 and 14, respectively. Air springs to support the vehicle weight and load may also be made of bladder construction and arranged between the axle and frame rails, such as the air springs 20 and 22, respectively, arranged in position below the frame rails 12 and 14 so as to transfer vehicle weight and load to the axle 28. Air springs 20 and 22 are of an effective cross sectional area $A_2$.

The weight support air springs 20 and 22 must be larger than the upper air springs 16 and 18, by an amount sufficient to support the vehicle weight, its load and the effective addition thereto of the pressure in the air springs 16 and 18. In order that the air springs 16 and 18 be effectively tied to the axle 28, a structure may be utilized to confine the air springs effectively between the frame rails of the truck and the axle. Herein, a plate 24 tied to the axle by tie rods 21 and 23, which loop under the axle and may be welded thereto, is adjustable in position over the air spring 16 by tightening or loosening the nuts 19 on the ends of the rods. The air spring 16 thus will be confined between its lower mounting plate 17 over the frame rail 12 and the plate 24 above it.

Similarly, the air spring 18 is confined above the frame rail 14 effectively by a plate 26 above the frame rail 14 and tied to the axle 28 by tie rods 25 and 27 looped about the axle and adjustably positioned relative to air spring 18 by the nuts 29 on the tie rods. Thus, the air spring 18 is confined between its mounting plate 15 directly over the frame rail 14 and the plate 26.

Other arrangements may be mechanically utilized. The air springs 16 and 18 could be placed under the axle 28 so that the tie rods could extend from the upper side of the frame rails 12 and 14 to plates 24 and 26 below the air springs placed under the axle.

Highway trucks are ordinarily equipped with a compressed air supply 34, herein shown diagrammatically. A connection conduit 36 through branches 38 and 42, each respectively valved at 40 and 44, may supply compressed air to the interior of the air springs described. Branch 38 through lines 30 and 31, respectively, supplies air to the right-hand lower air spring 22 and the left-hand upper air spring 16. The branches 30 and 31 connect the air springs 16 and 22 across the vehicle from left to right and vice versa. Similarly, air line 42 through branches 32 and 33 connects the load supporting air spring 20 on the left-hand side of the vehicle with the additional air spring 18 above the frame on the right-hand side of the vehicle. The branches 32 and 33 thus cross-connect the lower air spring 20 with the upper air spring 18.

The effect of so cross-connecting the air springs is to significantly increase the axle roll stiffness of the suspension system without requiring an increase in vertical spring stiffness. At the same time, load carrying capacity of the system may be increased with an increase in the air pressure in the air springs as is conventionally known with air springs used only between the load and the axle.

The space usually available for the imposition of air springs in the vehicle is a limiting factor on the amount of increase in stiffness against lateral forces (roll) that can be achieved. The effective area of the lower first springs relative to the effective area of the upper additional springs can determine the added stiffness against roll. It has been found that an increase in the stiffness against roll, an increase factor of $K_R$ over conventional springs on a similar spring base, may be obtained by varying the effective areas $A_1$ and $A_2$. The formula applicable is:

$$K_R = \left\{ \frac{A_2 + A_1}{A_2 - A_1} \right\}^2$$

As an example, should the effective area of the lower springs $A_2$ be twice that of the upper springs $A_1$, substituting the numbers 2 and 1 in the above formula, will give a $K_R$ of 9, which in use, would result in a roll stiffness 9 times that obtainable by conventional springs on the same spring base.

In another example, if the effective area of the spring $A_2$ is a factor of 10 and the effective area of the springs $A_1$ is a factor of 6, utilizing the formula, will indicate that the increased stiffness roll factor $K_R$ becomes 16. Only the space available in the vehicle provides a limit on the increase in stiffness over conventional springs on the same base, that may be achieved by the present invention. The lower weight supporting springs $A_2$ must, of course, be capable of supporting the load, the vehicle and the added influence of the springs $A_1$.

In operation, the suspension system described will offer improved roll characteristics during cornering of the vehicle. Assuming that all air springs are inflated at an equal pressure, sufficient to support the vehicle and its load, the operation in a turn can be described as follows, by way of example. In a right turn, lateral forces cause the sprung mass to lean to the left due to lateral acceleration producing forces on the springs. Lower left spring 20 is subjected to added compression expelling contained air through conduits 32, 33 to upper right spring 18. The thus added pressure in spring 18 acts on frame rail 14 to add compression against lower right spring 22 with the result that contained air is expelled through conduits 30, 31 to the upper left spring 16. The air pressure in the springs will equalize rapidly providing the desired spring stiffness to resist the lateral forces on the vehicle. When the vehicle comes out of the turn and resumes straight motion, the lateral forces are removed so that the air springs will all return to initial position.

With the present invention, any desired increase in roll stiffness over conventional springs on the same spring base, may be obtained by the addition of air springs or bladders in the system without the necessity of utilized roll stabilizer bars. While the system has been described in a pneumatic spring system, the principles may be utilized in a hydro-pneumatic strut suspension system wherein the spring rates are provided by accumulators or the like.

I claim:

1. A vehicle suspension system having improved roll stiffness characteristics, comprising:
   a wheeled axle and a mass to be supported on such axle;
   first pressurized air springs arranged between the mass and the axle on opposite sides of the vehicle and capable of supporting the mass;
   second pressurized air springs arranged between the mass and the axle on opposite sides of the vehicle adding its weight to the mass;
   said springs being pneumatically cross-vehicle-connected only from side to side between first and second air springs to increase spring stiffness against vehicle roll, said first springs being sized in excess of the size of the second springs to exert pressure at least equal to said mass plus said second air spring weight.

2. A suspension system as specified in claim 1 wherein the vehicle has a frame, the first air springs are arranged between such frame and the axle and an auxiliary spring support is secured to the axle for mounting the second air springs.

3. A suspension system as specified in claim 1 wherein the vehicle has a frame with both said first and second air springs exerting opposing forces on both the frame and the axle.

4. A suspension system as specified in claim 1 wherein air supply connections are provided to each cross-vehicle connected first and second air springs with means for controlling pressure in such connected springs to vary vertical spring stiffness and load carrying capacity in the system.

5. A suspension system as specified in claim 1 wherein the vehicle has a frame, said first springs are mounted between the axle and said frame, said second springs are mounted above the frame to bear downwardly thereon and a plate is positioned above each said second springs and tied to the axle to transfer second springs upwardly directed pressure to the axle.

6. A vehicle suspension system having improved roll stiffness characteristics, comprising:
   a wheeled axle and a mass to be supported on such axle;
   first pressurized air springs arranged between the mass and the axle on opposite sides of the vehicle and capable of supporting the mass;
   second pressurized air springs arranged between the mass and the axle on opposite sides of the vehicle adding its weight to the mass;
   said springs being pneumatically cross-vehicle-connected only from side to side between first and second air springs to increase spring stiffness against vehicle roll, said first springs being sized in excess of the size of the second springs to exert pressure at least equal to said mass plus said second air spring weight, and
   wherein desired roll stiffness may be increased and decreased by changing the effective area of the first springs relative to the effective area of the second springs, to provide a roll stiffness factor increase equal to the quantity of the sum of said first and second springs areas divided by the difference in said spring areas, squared.

7. A vehicle suspension system having improved roll stiffness characteristics, comprising:
   a wheeled axle and a vehicle frame for supporting vehicle sprung mass and load upon the axle;
   mass supporting fluid springs operatively arranged between the axle and frame to support said mass and load on said axle;

additional fluid springs arranged between said axle and frame in opposition to said mass supporting springs, said springs being located on opposite sides of the vehicle; and a cross-vehicle fluid connection between each mass supporting springs on one vehicle side to the additional springs on the other vehicle side providing spring stiffness opposed to lateral forces exerted thereon by the sprung mass, said mass supporting fluid springs being sized in excess of the size of said additional springs to exert pressure at least equal to said mass plus said additional fluid spring weight;

whereby desired roll stiffness may be increased and decreased by changing the effective area of the mass supporting springs relative to the effective area of the additional springs.

8. A vehicle suspension as specified in claim 7 wherein each spring is pneumatic.

* * * * *